United States Patent [19]

Wedin et al.

[11] 4,090,721
[45] May 23, 1978

[54] APPARATUS ACTING REINFORCINGLY IN COLLISIONS TO PROTECT REARWARDLY PLACED FUEL TANKS IN VEHICLES FROM DEFORMATION DAMAGES

[75] Inventors: Sten Henrik Wedin, Floda; Torsten Gunnar Lindberg, Ockero, both of Sweden

[73] Assignee: AB Volvo, Goteborg, Sweden

[21] Appl. No.: 694,013

[22] Filed: Jun. 8, 1976

[30] Foreign Application Priority Data

Jun. 13, 1975 Sweden ............................. 7506812

[51] Int. Cl.² ........................................ B60K 15/08
[52] U.S. Cl. ............................. 280/5 A; 280/106 R
[58] Field of Search ............... 280/5 A, 5 R, 106 R; 296/28 R; 180/89.1

[56] References Cited

U.S. PATENT DOCUMENTS 3,014,730  12/1961  Cole ................................ 280/5 A
3,655,237   4/1972  Pitman .......................... 280/106 R
3,883,166   5/1975  Cadiou .......................... 280/28 R Primary Examiner—Joseph F. Peters, Jr.
Assistant Examiner—John A. Pekar
Attorney, Agent, or Firm—Young & Thompson

[57] ABSTRACT

In a vehicle having a fuel tank at the rear of the vehicle rear axle an apparatus acting reinforcingly in collisions to protect the fuel tank from deformation damage. On both sides of the tank the apparatus comprises a support connected with an adjacent side member of the vehicle chassis in an area at the rear of the rear axle, and a support portion attached to the rear axle and connected with an adjacent side member in the area ahead of said axle. At the forward end of the support there is provided a force transferring surface which is normally spaced from an associated rear contact surface of the support portion. When the vehicle is subjected to a collision the force transferring surface is brought into contact with the contact surface of the support member upon deformation of the vehicle rear structure, whereby part of the impact forces due to the collision are led past the tank and curved portions of the side members via the interacting support and support member, so that the tank is protected against deformations that could otherwise bring about fuel leakage from the tank.

6 Claims, 6 Drawing Figures

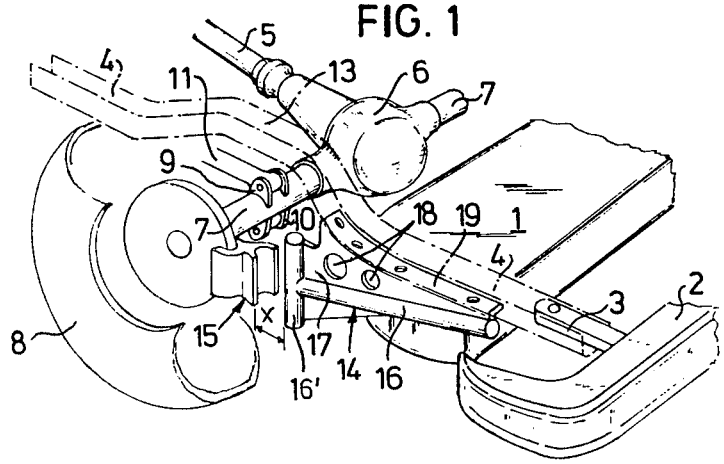
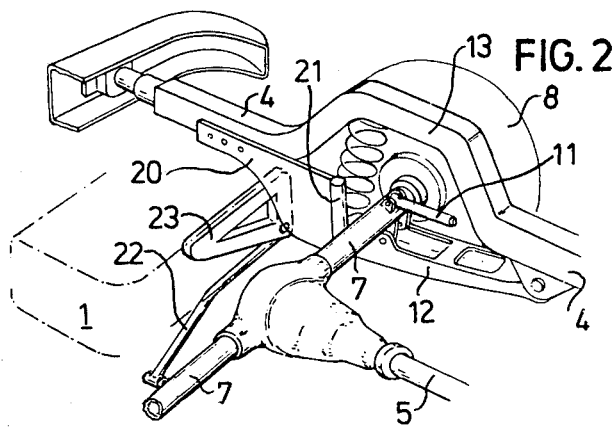
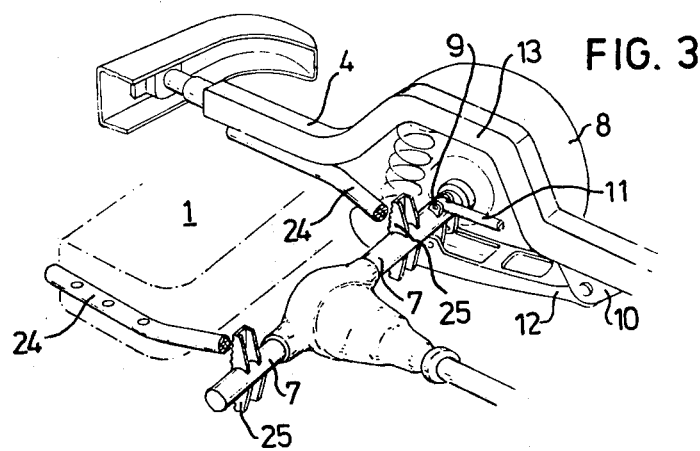

APPARATUS ACTING REINFORCINGLY IN COLLISIONS TO PROTECT REARWARDLY PLACED FUEL TANKS IN VEHICLES FROM DEFORMATION DAMAGES

The present invention relates to an apparatus acting reinforcingly in collisions with vehicles having a fuel tank situated behind the rear axle of the vehicle in the area between longitudinal frame side members of the chassis which have an upwardly curved portion over the back axle, whereby the apparatus is arranged to protect the tank with associated connections against deformation damage when the rear portion of the vehicle is deformed, e.g. as a result of being driven into from behind.

In many kinds of vehicle and especially passenger cars, the fuel tank (usually a gas tank) and connections thereto have a relatively exposed position, especially in the type of collision where the vehicle is driven into from behind, or when the vehicle backs or rolls against another vehicle or fixed object. If leakage in the fuel tank or its connections occurs at such a collision, the fuel (exemplified below by gasoline) which streams or spurts out can catch fire, which will naturally cause severe damage to the vehicle and, what is considerably more serious, can lead to severe personal injury.

It is forecast that in a few years there will be regulations in force which stipulate that at most a certain (very limited) amount of gasoline or other fuel may leak out from the tank and its connections when a vehicle is exposed to certain kinds of collision, the vehicle being exposed to these in specified collision tests including, inter alia, being driven into from behind.

Present types of automobile would generally need modification to meet the standards set up for the collision tests.

The object of the invention is to provide a simple, cheap and comparatively compact reinforcing apparatus protecting a fuel tank in a collision, especially a rear end collision, wherein the reinforcing apparatus shall be such that it may be applied in the form of a modification to presently existing vehicle structures as well as being applicable in normal vehicle manufacture. The functional principles for the new kind of apparatus, which acts reinforcingly, shall naturally be applicable to automobiles of varying makes. One condition in this respect is, inter alia, that the structure parts incorporated in the reinforcing apparatus must be capable of being placed at such locations under the vehicle that are not usually already occupied by other equipment.

The problem forming the basis of the invention is thus to produce a reinforcing apparatus having the ability of protecting a fuel tank with associated connections placed at the rear of the vehicle when the vehicle is involved in a collision. The overriding principle of the invention is that the rear portion of the vehicle is divided into a relatively mechanically strong and a relatively weak portion, whereat the strong portion is arranged for protecting the tank while the weaker portion functions to absorb energy on collision, i.e. by being deformed having the ability to dissipate a not inconsiderable part of the impact energy. The apparatus shall furthermore be such that it transmits the inertia force from the engine and transmission directly to the colliding object.

A previously known method of solving the problem is to protect the gas tank with associated fuel pipe connections by placing the tank at such a location in the vehicle that the deformations caused by the collision cannot be expected to reach it, which may mean, for example, that the tank is placed in front of or above the back or rear axle. Such placing of the tank is for certain reasons, inter alia those set forth below, unsuitable or in many cases impossible. Such placing of the tank results namely in that the drive shaft cannot be placed in the normal way, that the interior space in the automobile is diminished, that an excessively high centre of gravity is obtained for the vehicle and that the fuel system cannot be kept separate from the passenger space, which is extremely desirable. Other drawbacks are that the ability of the vehicle to withstand types of collision other than rear end collisions deteriorates, that types of automobiles already in production must be modified, and that floor height must be increased in many cases, which is especially disadvantageous in dual-purpose types of automobile.

An alternative known solution in this connection is that the rear wheel circumferences are allowed to take up some of the collision forces via reinforced rear wings or beams. This has however the disadvantage that the tank is given poor protection for the case where a tire is punctured. The requirements for normal tire resilience, space in the wheel housing for snow chains (and snow), wheel changes etc. also lead to there being a large distance to the force absorbing surface, which means that shifts riskful to the tank can occur in the bodywork and chassis.

A further known way of reinforcing the rear portion of the automobile is by inserting stiffeners in its upper portion, e.g. interiorly in the upper portions of the wings. Only limited collision forces can be taken this way through the automobile however, since otherwise it must be assumed that door locks, rear seat belts, windows etc. can be put out of operation or damaged, with ensuing personal injury. The said method of reinforcing the rear portion of the automobile can however be used supplementary to reinforcing the bottom portions of the automobile directly opposite the tank. A certain stiffening of the rear wings opposite the fuel filling location is thereby obtained, thus providing this with protection against such damage which can cause leakage in a rear end collision.

The object of the present invention is to solve the basic problem stated above by a new type of reinforcing apparatus which does not have the drawbacks accounted for above, and burdening known constructions for providing the fuel tank with collision protection.

According to the invention the problem is solved by there being arranged at either side of the tank a supporting means extending mainly in the longitudinal direction of the vehicle, and attached to the respective adjacent side frame member in the area rearward of its curved portion, said supporting means having at its forward end a force transmitting surface normally situated at a certain distance from an associated backwardly facing force transmitting surface of a deformation resistance supporting portion associated with the chassis, and situated in front of the tank, e.g. a supporting portion attached to an adjacent side frame member and/or the rear axle, with good ability to take up deformation forces generated by the collision with only limited deformation, and that said distance is so adjusted that the coacting force transmission surfaces come into contact with each other at a certain deformation of the rear portion of the vehicle, whereby the deformation forces are lead past the tank and the curved portions of the frame side members so that deformations dangerous to the tank do not occur.

Although the invention is primarily conceived for vehicles with rigid rear axles, it is naturally also applicable for other types of rear axle. The term "chassis" in this connection is regarded as comprising the whole of the vehicle bottom portion with associated machine parts such as engine, couplings, gear box drive shaft and rear axle with differential. The frame side members in question can also naturally be integrated with the sheet metalwork of the body to a greater or lesser extent. The said distance between the force transmitting surfaces of the support means and the support portions is required to enable the normal movements of the wheels and rear axle (e.g. springing movements) in relation to the chassis and bodywork.

With a reinforcing apparatus according to the invention it will thus be possible effectively to protect the gas tank and its connections, since the forces generated by a rear end collision are to a substantial degree led past those girder portions in the chassis and/or bodywork which are more or less curved, e.g. in the area above the rear axle, thereby having poor ability to take up compression forces. If these curved portions of the girders buckle or collapse in some other way in a collision, the tank in the location in question is namely displaced in the automobile and is pressed up against the differential housing and the back axle, which causes great risk of leakage.

It perhaps appears natural to have the curved frame side members reinforced instead so that these have the same ability of taking up compression forces as the reinforcing apparatus according to the invention. Such reinforcement would however give an unacceptable increase in weight to the vehicle.

Among the advantages of the structure according to the invention may be mentioned that with a simple and cheap constructional means it is achieved that the region where the tank is placed is substantially unaffected and exposed only to minor alteration of shape in a collision. A location fixation of the tank is also provided indirectly through the extra bracing of the bodywork. The front wall of the tank is hereby protected against being forced against the rear axle. The apparatus according to the invention has also the essential advantage of giving considerable strength for a very limited increase in weight.

In a vehicle which lacks the reinforcing apparatus according to the invention, there is considerable risk that the straight portions of the frame side members of the automobile constituting the continuation of these members backwards behind the said curves over the back axle can be crumpled or deflected opposite the tank, which is thereby squeezed together, especially in a rear end collision.

The apparatus according to the invention has preferably an extension in the longitudinal direction of the vehicle which approximately corresponds to the extension of the tank in this direction, and the reinforcing apparatus is attached to the girder system opposite the tank so that the girder system is reinforced and thereby protects the tank in a rear end collision. The frame side members thus reinforced by the reinforcing apparatus stand up to the high load considerably better than non-reinforced members, such load occurring when the non-reinforced rear portions of the members are crumpled in a rear end collision, thereby absorbing a portion of the collision energy.

A big advantage with the reinforcing apparatus according to the invention is furthermore that the apparatus can be placed well out to the sides of the vehicle so that it does not unnecessarily encroach on the space required for other equipment, e.g. exhaust pipe, fuel tank, gas pump, crossbracing etc. A consequence hereof is also that the apparatus could be mounted on any existing types of automobile or, in a late stage of design work, be introduced as a supplement on new automobile types. The support means and support portions incorporated in the reinforcing apparatus according to the invention can further be attached to the frame side members or the rear axle and/or the straight portions of the frame side members in front of the rear axle with the help of conventional bolt connections, allowing exchange of details if damage occurs. The invention can also be easily adapted to different kinds of automobiles. In the cases where the support means and support portions do not need to be pivotably attached, it is self-evidently preferable to use welding for attachment in many cases.

In a primarily preferred embodiment of the apparatus according to the invention, each support means consists of a stiff support strut rigidly mounted on the associated frame side member, the force transmitting surface of said strut having greater extension in height than in width and the support portion coacting with the support means a support strut consists of a modified brake caliper with a corresponding backwardly facing force transferring surface. The collision forces introduced into the vehicle via the rear bumper during a collision will, in an apparatus of the last-mentioned kind, be transferred to a substantial extent to the forward portion of the vehicle via the support means shaped as a support strut, the brake caliper in front of it, the rear axle, the upper and lower carrying arms and the drive shaft. If the collision force can be regarded as introduced into the rear bumper at its middle, the force transference will naturally be divided approximately equally to the reinforcing apparatus on either side of the vehicle. The distance between the respective force transferring surfaces of the support means and support portion naturally only need to be as large as will allow the normal springing movement of the rear axle. Through the invention, the curved portions of the frame side members over the rear axle are spared to a substantial extent from being loaded by compression forces subsequent to the collisoin. The portions of the members which lie behind the supporting means can to advantage be relatively weak to enable the abosrbing deformation in this region of the vehicle.

In an alternative embodiment according to the invention, each support means consists of a stiff supporting strut rigidly mounted on an associated frame side member, the strut having a force transferring surface with greater height than width, and with the backwardly facing force transferring surface of the support portion coacting with this force transferring surface consisting of a portion of the outside of the vehicle rear axle, this being of the rigid type of rear axle, and constituting per se the support portion. The support means having a certain extension in height is imperative for it to engage the rear axle with certainty in a rear end collision, irrespective of the vertical position the rear axle assumes for the moment. In this last-mentioned embodiment, considerable amounts of the collision forces are transferred directly by the apparatus to the rear axle, from which said forces are led forward in the vehicle towards its middle portion and engine, via the rear axle suspension means and the drive shaft. An advantage with this particular embodiment is that no special support portions are required, since the rear axle itself with a surface portion constitutes the support portion.

An alternative according to the invention is that each support means consists of a stiff bar rigidly mounted on an associated frame side member, the end surface of the bar facing the rear axle constituting the force transferring surface of the means, and that the coacting support portion has the shape of a supporting bracket having a force transferring surface with greater height than width, and being attached to the rigid rear axle, said surface extending from a point a distance below the rear axle to a point approximately as much above the rear axle. Since the support means, in this case shaped as a support bar, has a relatively small force transferring surface, it is necessary for the supporting portion to have a relatively great extension in height so that contact will always be possible between the two force transferring surfaces facing each other, independent of the actual springing position of the rear axle. The advantages with this embodiment are, inter alia, that the supporting bars are placed high up, and that the support brackets accompany the wheel axle in its movement relative to the chassis.

Also within the scope of the invention there is an embodiment in which each support means comprises a stiff support bracket rigidly attached to an associated frame side member, whereby the support portion consists of a mainly vertical supporting foot situated behind the rear axle and forming the free rear buffer end of a lower carrying arm hingedly attached to the underside of the rigid rear axle, the forward end of the lower carrying arm being hingedly attached to the frame side member at a straight portion situated forward of its curved portion. With this embodiment a part of the collision forces is transferred directly to the frame side member forward of the rear axle. The lower carrying arm in this embodiment has the task of taking up relatively large collision loads, which in certain cases can be an inconvenience, as risk of buckling and bending the carrying arm and even the shearing of its attachment bolts can arise. A consequence of this embodiment is that the heavy mass system, consisting inter alia of the rear axle, drive shaft etc., is drawn forward by the carrying arm instead of being pushed forward by the impact, as is the case with the embodiments described above, whereby the system will deflect backwards some centimeters towards the tank after being driven into.

An alternative related to the last-mentioned embodiment is characterized according to the invention in that each support means consists of a support stay hingedly attached at its rear end to an associated frame side member and oscillatable in a vertical plane, which is mounted at its forward end by means of an elongate hole on a carrying stud or pin attached to an extension portion projecting rearward of the rear axle, of a lower carrying arm hingedly attached on the underside of the rigid rear axle, the forward end of the carrying arm being pivotably mounted at a straight portion of the associated frame side member situated forward of the curved portion of the member. The advantages with this embodiment are, inter alia, large ground clearance, small space requirements and the absence of bending moment in the support means shaped as a support stay.

The reinforcement in the area above the rear axle of the curved portion of the frame side member which is obtained with this embodiment will however be relatively limited in comparison with what is obtained with a support means made as a bracket or strut and rigidly attached to a frame side member according to the embodiments accounted for above.

The invention will now be explained and described in more detail while referring to some of the embodiments shown in the appended drawings.

In the drawings,

FIG. 1 shows very schematically the parts of interest for the invention at the left rear portion of a motor vehicle, which is provided with a reinforcing apparatus according to the invention at the frame side members (only one frame side member of the vehicle is shown);

FIG. 2 shows in the same schematic way as FIG. 1 a perspective view of the left rear portion of a vehicle seen obliquely from the opposite side and showing a second embodiment of the invention;

FIG. 3 shows in the same perspective as FIG. 2 a third embodiment of the invention.

Figure 4:
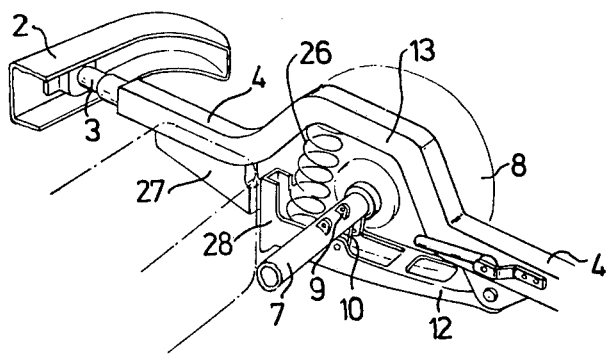
FIG. 4 shows in the same perspective as in FIG. 3 a fourth embodiment of the invention.

For the sake of simplicity, FIG. 1 shows only the part on the left of a vehicle provided with reinforcing apparatus along the short sides of a fuel tank 1. The reinforcing apparatus on the right hand side (not shown) of the vehicle is to opposite hand of that shown in FIG. 1 and therefore does not need to be commented on any further. The description of the reinforcing apparatus is also restricted to one side of the vehicle in the remaining embodiments described below.

In the drawings the numeral 2 designates the rear bumper of the vehicle, attached to the rear end of the left frame side member 4 of the vehicle via attachment means 3. Further in the drawings, a drive shaft is designated by the numeral 5, a differential by 6 and a rigid rear axle by 7. The rear axle 7 carries a wheel 8 which is only partly shown. In the usual manner, the rigid rear axle has an upper attachment 9 and a lower attachment 10 for upper and lower carrying arms 11 and 12 respectively (see also FIGS. 2 and 3). In the region over the rear axle 7, the frame side member 4 has an upwardly curved portion 13 with less buckling resistance than that of the member 4.

The main components constituting the reinforcing apparatus are on the one hand, the support means attached to the member 4 and shaped as support strut 14, and on the other hand, the support portion 15 at a distance x in front of the support strut 14. The support portion 15 constitutes a modified brake caliper on the brake for the wheel 8. The support strut 14 is attached through holes to the member 4, e.g. by means of screws. The support strut could per se be welded to the member 4, however. The support strut consists substantially of two bars or tubes 16 and 16' welded together and to a carrying plate 17 provided with lightening holes 18 and an upper flange 19, by means of which the support strut is attached to the side frame member 4. The distance x between the force transferring surfaces of the support strut and the support portion is required to enable normal springing movements of the wheel 8 in relation to the vehicle and thereby to the member 4. The bar or tube 14' has a greater extension in height than the support portion shaped as a support bracket 15, to enable contact between the force transferring surfaces of the support strut 14 and the support portion 15 for all springing positions of the wheel 8 and rear axle 7. Through the presence of the support strut 14 the tank 1 will be in an area wherein the side member 4 is reinforced, which means that the tank is protected against being pushed together, for example in a rear end collision. Because of the reinforcing apparatus, the collision forces introduced into the vehicle in a rear end collision will to a substantial degree be taken past the portion 13, which is weakly resistant to buckling, of the member 4 via the support strut 14, support portion 15, rear axle 7, differential 6 and drive shaft 5. The upper and lower carrying arms 11 and 12 also contribute to transferring the impact force from the support portion 15 forward in the vehicle, more exactly via the straight portion of the member 4 situated in front of the rear wheel 8. Said force transfer paths are shown schematically in FIG. 6.

In FIG. 2 wherein parts having correspondence with the embodiment according to FIG. 1 are designated with the same reference numerals as in that figure, there is shown a second embodiment of the reinforcing apparatus according to the invention. In this embodiment the support means consists of a stiff support strut 20 attached to the rear straight portion of the frame side member 4, the front end of the strut 20 being provided with a reinforcing bar 21 having a front curved surface constituting the force transferring surface of this strut. In this embodiment the support portion consists of the rear axle 7 itself, the rear curved surface of which thus constitutes its force transferring surface. The bar 21 has naturally such a length extension that a portion of the bar always is opposite the rear axle 7, independent of the springing position of the rear axle in relation to the frame side member 4. In the figure, a transverse stay is designated 22, while 23 designates a mounting bracket for the stay. As will be seen, in this embodiment no special support portions are required, since the rear axle 7 constitutes the support portion per se. To reduce the necessary length of the bar 21 it is however possible to weld a support portion made as a support bracket onto the rear axle 7 opposite to the bar 21.

In FIG. 3 there is shown a third embodiment of the reinforcing apparatus according to the invention. In the figure, parts having correspondence with the embodiment according to FIG. 1 are designated with the same reference numerals as used therein. In this case the support means has the shape of a stiff support bar 24 with its front end constituting the force transferring surface of the support means. In this case the support portion coacting with the support bar 24 takes the form of a support bracket 25 welded on to the rear axle 7, with sufficient extension in height to enable contact with the force transferring surface of the support bar 24 in all conditions. Amongst the advantages of this embodiment may be mentioned good ground clearance, since the support bars 24 are relatively highly placed and the support brackets 25 accompany the wheel axle up and down as a result of springing caused by unevenness in the substructure on which the vehicle is driven. As the support bars 24 have been given a slightly bent shape they have had room at the side of the tank 1 without being in the way of remaining constructional parts. The slight bend in the support bars 24 does however increase the risk that they will buckle in a rear end collision. Slightly bent support bars are however to be preferred in many cases, since straight ones would encroach disadvantageously on the tank space.

A fourth embodiment of the invention is shown in FIG. 4, wherein the parts having correspondence with the embodiment according to FIG. 1 have been given the same reference numerals as in this figure. A helical spring with shock absorbing function incorporated in the wheel suspension is designated 26. Here the support means comprises a stiff support bracket 27 attached to the rearward straight portion of the frame side member 4, while the support portion in this case consists of the free rear buffer end 28 of the lower carrying arm 12. The carrying arm 12 is hingedly attached at the mounting 10 on the underside of the rear axle 7. The support portion 28 is shaped as a vertically disposed supporting foot with such extension in height that the forward force transferring surface of the support bracket 27 is always opposite some portion of the supporting foot, independent of the vertical position of the rear axle 7. With this embodiment, a part of the collision forces is transferred directly to the member 4 via the lower carrying arm 12. This embodiment has however the disadvantage that the lower carrying arm must be made sufficiently strong to withstand the impact forces introduced via the support bracket 27 without buckling, bending or being deformed in any other way.

Figure 5:
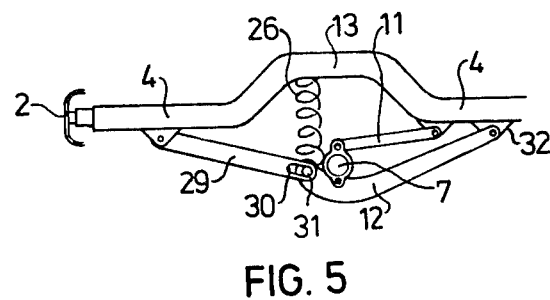
FIG. 5 shows a side view of the rear portion of a vehicle provided with a fifth embodiment of the invention.

In FIG. 5 there is shown a fifth embodiment of the reinforcing apparatus according to the invention, parts having correspondence with the embodiment according to FIG. 1 having been given the same reference numerals as in the latter figure. In this embodiment the support means takes the form of a support stay 29 hingedly mounted on the straight rearward portion of the member 4. This support stay, which is oscillatable in a vertical plane under the member 4, is provided in its forward end with an elongate hole 30 the rear bearing surface of which constitutes the force transmitting surface of the support stay. Through the elongate hole 30 the stay 29 is accommodated and mounted on a stud 31 attached to the outer end of a backwardly projecting extended portion of the lower carrying arm 12. A helical spring incorporated in the wheel suspension is designated 26. Through the attachment 32 the lower carrying arm is pivotably mounted on the underside of a straight portion of the member 4 forward of the upwardly curved portion 13. The support stay 29 suitably consists of a single tube or a telescopic type tubular construction. The advantages with this embodiment are, inter alia, large ground clearance, compact construction and low weight for the apparatus, although no real girder reinforcement in the area of the upwardly curved portion 13 of the frame side member 4 is obtained with this construction.

In summary it can be said that the reinforcing apparatus according to the present invention acting reinforcingly in collisions offers effective protection to the fuel system especially for rear end collisions, and when the fuel tank is placed approximately in the way shown in FIG. 1. The reinforcing apparatus functions so that the portion of the automobile rear end in which the fuel tank is placed avoids being exposed to large deformations, inter alia, because the curved portion of the frame side member in the region over the back axle is relieved of a substantial part of the collision forces, which are instead taken past this curved portion via the reinforcing apparatus. This is particularly the case with the embodiments according to FIGS. 1-3. The large inertia forces generated as a result of the collision, mainly coming from the engine and transmission, are led along a special path past the sensitive area. In the preferred embodiment shown in FIG. 1, the path of said inertia forces is via the drive shaft, rear axle, brake calipers and the stiff support means attached to the frame side member directly over to the colliding object. The arrangement thus accommodates portions of the collision forces without the rear axle suspension thereby being exposed to large stresses, this assuming that the rear axle is relatively resistant to bending.

Figure 6:
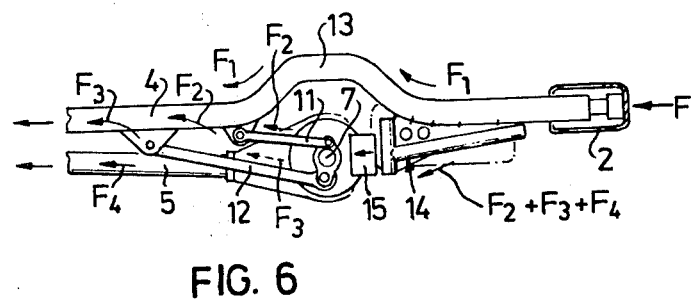
FIG. 6 shows finally a schematic side view of the force transmitting paths of the collision forces in a vehicle provided with the apparatus according to FIG. 1.

In FIG. 6 is finally shown very schematically how a collision force F applied to the rear bumper of a vehicle is transmitted forwardly in the vehicle. It is assumed here that the force F strikes the rear bumper 2 at its middle so that the force 0.5 F is to be transmitted along the left hand side frame member 4 of the vehicle. The embodiment of the reinforcing apparatus shown in the figure corresponds substantially to the one shown in FIG. 1. The portion of the force F, i.e. 0.5 F which is transmitted forward in the vehicle via the reinforcing apparatus shown in FIG. 6 and situated to the left of the rear portion of the vehicle will follow two paths. The first is the upper path via which the portion $F_1$ of the collision force is taken forward in the vehicle. This force transmission path thus goes via the upwardly curved portion 13 of the member 4. However, a substantial portion of the applied collision force goes along a second lower path via the reinforcing apparatus according to the invention. The portion of the collision force which is transferred via this lower path is the portion $F_2 + F_3 + F_4$. This portion is transmitted when the support strut 14 has come into contact with the upper portion 15 (which consists of a modified brake caliper) to the rear axle 7, wherefrom said force then follows three different paths forwardly in the vehicle. A first portion $F_2$ is transferred to the forward portion of the member 4 via the upper carrying arm 11, and a second portion $F_3$ is transferred to the same frame side member via the lower carrying arm 12, while the last portion $F_4$ of the force transmitted via the reinforcing apparatus is led forwardly in the vehicle via the drive shaft 5. The effect is thus achieved by the invention that a considerable portion of the impact energy applied through a rear end collision is propagated in the vehicle without considerably deforming the region of the vehicle rear portion within which the fuel tank is situated.

It is mentioned in conclusion that the embodiments of the invention accounted for above only constitute examples of the embodiments lying within the scope of the invention, said scope being however defined through the patent claims below.

What we claim is:

1. In a motor vehicle having a fuel tank, a rear axle forward of the fuel tank, longitudinal frame side members disposed on either side of the fuel tank, said side members each having an upwardly curved portion over the rear axle and a straight horizontal portion behind the rear axle, and means interconnecting the rear axle and said side members; the improvement comprising reinforcing apparatus that acts reinforcingly in collisions to protect the fuel tank, said reinforcing apparatus comprising support means extending substantially in the longitudinal direction of the vehicle and attached to each of said straight portions and having a front end each said support means having at its front end a force-transferring surface which is normally spaced a distance behind an associated rearwardly facing force transferring surface of a support portion which is resistant to deformation, and means mounting said support portion on one of the frame side members adjacent said curved portion and said rear axle and forward of the fuel tank, whereby upon deformation of the rear of said vehicle, said forcetransferring surfaces come into contact with each other and a portion of the forces causing said deformation are led past the fuel tank on either side of said fuel tank thereby to avoid deformation of said fuel tank.

2. Apparatus as claimed in claim 1, characterized in that each support means comprises a stiff support strut (14) rigidly mounted on an associated frame side member, the force transmitting surface of the strut having a greater extension in height than in width, and that the support portion coacting with the strut comprises a brake caliper (15) having a corresponding force transmitting surface facing rearwardly.

3. Apparatus as claimed in claim 1, characterized in that each support means comprises a stiff support strut (20) rigidly mounted on an associated frame side member, the force transferring surface of the strut having greater height than width, and that the rearwardly facing force transferring surface of the support portion coacting with this force transferring surface constitutes a portion of the outside of the vehicle rear axle (7).

4. Apparatus as claimed in claim 1, characterized in that each support means comprises a stiff support bar (24) rigidly attached to an associated frame side member (4), the end surface of the bar facing the rear axle constituting the force transferring surface of the support means, and that said support portion comprises a support bracket (25) attached to the rear axle, said bracket having thereon said force-transferring surface, said force-transferring surface of the bracket having a greater height than width and extending from a point a distance below the rear axle (7) to a point approximately as much above the rear axle.

5. Apparatus as claimed in claim 1, characterized in that each support means comprises a stiff support bracket (27) rigidly mounted at an associated frame side member (4), and that the support portion comprises a vertical support foot (28) situated rearward of the rear axle, and forming a free rear buffer end of a lower carrying arm (12) hingedly attached to the underside of said rear axle (7), the carrying arm (12) having a forward end hingedly attached to said frame side member (4) at a straight portion thereof situated forward of said curved portion (13).

6. Apparatus as claimed in claim 1, characterized in that each support means comprises a support stay (29), oscillatable in a vertical plane and hingedly attached at its rear end to an associated frame side member (4), the front end of the stay being mounted by means of an elongate hole (30) on a carrying stud (31) attached to an extended rearwardly projecting portion of a lower carrying arm (12) rearward of the rear axle (7), said lower carrying arm (12) hingedly attached to the underside of the rear axle and having a front end pivotably mounted (32) at a straight portion of the associated frame side member (4) situated forward of the curved portion (13) of the member.

* * * * *